United States Patent [19]

Reuschel et al.

[11] Patent Number: 5,500,477

[45] Date of Patent: Mar. 19, 1996

[54] POLYACETAL MOLDING MATERIALS HAVING HIGH IMPACT RESISTANCE, A PROCESS FOR THEIR PREPARATION, AND THEIR USE

[75] Inventors: Gerhard Reuschel, Biblis; Dietrich Fleischer, Darmstadt, both of Germany; Kaoru Yamamoto; Shuichi Chino, both of Fuji, Japan

[73] Assignee: Hoechst Aktiengesellschaft, Germany

[21] Appl. No.: 430,888

[22] Filed: Apr. 26, 1995

Related U.S. Application Data

[63] Continuation of Ser. No. 131,291, Oct. 4, 1993, abandoned.

[30] Foreign Application Priority Data

Oct. 3, 1992 [DE] Germany .............. 42 33 308.8

[51] Int. Cl.$^6$ ................................. C08L 61/02
[52] U.S. Cl. ................. 525/398; 528/230; 528/232; 528/235; 528/236; 528/242; 528/250; 528/270; 525/472; 524/81
[58] Field of Search ............... 528/230, 232, 528/235, 236, 242, 250, 270; 525/398, 472; 524/81

[56] References Cited

U.S. PATENT DOCUMENTS

| 3,372,145 | 3/1968 | Okamura et al. | 528/232 |
| 3,597,397 | 8/1971 | Chen | 528/241 |
| 4,517,319 | 5/1985 | Reske et al. | 523/200 |
| 4,978,725 | 12/1990 | Reske et al. | 525/399 |
| 5,039,741 | 8/1991 | Burg et al. | 525/64 |
| 5,047,471 | 9/1991 | Burg et al. | 525/66 |

FOREIGN PATENT DOCUMENTS

| 1520845 | 1/1976 | European Pat. Off. . |
| 0156285 | 4/1981 | European Pat. Off. . |
| 0116456 | 8/1984 | European Pat. Off. . |
| 0117664 | 2/1989 | European Pat. Off. . |
| 0325052 | 7/1989 | European Pat. Off. . |
| 0115847 | 11/1989 | European Pat. Off. . |
| 0115846 | 11/1990 | European Pat. Off. . |
| 0421973 | 4/1991 | European Pat. Off. . |
| 0504405 | 9/1992 | European Pat. Off. . |
| 0559496 | 9/1993 | European Pat. Off. . |
| 728307 | 8/1969 | France . |
| 1906845 | 12/1969 | Germany . |
| 2356531 | 5/1975 | Germany . |

OTHER PUBLICATIONS

Makromolekulare Chemie, Macromolecular Chemistry and Physics, Bd. 190, Nr. 5, Mai 1989, Basel CH Seiten 929–938 M. Bednarek et al.

Patent Abstracts of Japan, vol. 16, No. 425 (C–0982) 7. Sep. 1992 & JP–A–04 146 949 (Nippon Unicar Co. Ltd.) 20 Mai 1992.

Primary Examiner—Samuel A. Acquah
Attorney, Agent, or Firm—Connolly & Hutz

[57] ABSTRACT

A moulding composition based on linear polyoxymethylene copolymers and customary additives with a melt index MFI (2,16 kg, 190° C.) of $\leq 0,8$, preferably $\leq 0,5$ and especially $\leq 0,2$ g/10 min has an extraordinary high toughness, which eliminates an addition of elastomer modifiers. In its preparation Lewis acids or protonic acids are used as initiators.

10 Claims, No Drawings

POLYACETAL MOLDING MATERIALS HAVING HIGH IMPACT RESISTANCE, A PROCESS FOR THEIR PREPARATION, AND THEIR USE

CROSS-REFERENCE TO RELATED APPLICATION

This application is a continuation of application Ser. No. 08/131,291, filed on Oct. 4, 1993 now abandoned.

Polyacetal molding materials having high impact resistance, a process for their preparation, and their use.

The present invention relates to high impact resistance polyacetal molding materials that have a particularly high molecular weight, and also to a process for their preparation and their use.

Thermoplastic molding materials formed from polyoxymethylene homopolymers and copolymers, hereinafter identified as POM, have long been frequently used as versatile materials, especially in the technical sector.

They are suitable on account of their outstanding mechanical properties, such as high rigidity, hardness and strength, and also on account of the fact that molded parts and moldings can be produced to strict tolerance limits, and in many cases they can be used as a substitute for metals on account of their good resistance to a large number of chemicals. However, for a number of applications their impact resistance, and in particular their multiaxial impact resistance, is too low.

The commercially available polyacetals cover a broad range of melt viscosities for various applications. In the high molecular weight range products having a melt flow index $MFI_{190° C./2.16 kg}$ of from 2.5 to 1.0 g/10 minutes represent the upper limit for the molecular weight of the commercial products. Types of lower molecular weight are available having an $MFI_{190° C./2.16 kg}$ of up to 50 g/10 minutes. Examples can be found in the product brochures published by polyacetal manufacturers. The polyacetals are generally prepared by known methods using $BF_3$ or $HClO_4$ as initiators, the amount of the aforementioned initiators being about 150 ppm and about 2 ppm, respectively.

However, all these materials have impact resistance values that are not sufficient for critical and demanding applications. The notched impact strength $a_k$ according to DIN 53435 in the commercially available products is from 4.0 to 6.5 $mJ/mm^2$. Similarly, in the penetration test according to DIN 53443 the deformation of 2.0 mm and the required fraction energy of about 2.0 J are insufficient for some purposes.

The toughness of the polyacetals can be improved by incorporating crosslinked or un-crosslinked or even grafted elastomers into the POM polymer matrix. This modification of the POM has already been disclosed in the following European Patents: EP 115,846, EP 115,847, EP 116,456, EP 117,664 and EP 156,285, and has already been used for a fairly long time in the production of impact-modified commercial products. Although the impact resistance of POM mold is certainly improved, nevertheless considerable problems additionally occur in the preparation and processing of these polymer compositions. In particular the homogeneous dispersion of the foreign substances in the polyacetal matrix involves large additional effort and expenditure in the production of impact-modified products. The impact modifiers that are used are furthermore often sensitive to solvents, motor fuels or other chemicals. The area of use of the modified polyacetals is restricted compared to that of polyacetals without impact modifiers.

It is an object of the present invention to improve the impact resistance of polyacetal molding materials without having to accept the disadvantages resulting for example from an admixture of foreign substances. Furthermore, the good resistance to chemicals of the unmodified polyacetals should be achieved. At the same time the material should be able to be processed by the conventional methods used for POM, such as injection molding or extrusion.

We have found that this object is achieved by the present invention.

DE-A 15 20 845 describes a process for preparing polyoxymethylene homopolymers with ultra-high molecular weights, the polymerization taking place in the pure solid trioxane phase. This process cannot be used however in the preparation of very high molecular weight acetal copolymers since the presence of comonomers prevents the formation of sufficiently pure crystals.

The invention relates to molding materials of linear polyoxymethylene copolymers having improved mechanical properties, wherein the melt flow index MFI at 2.16 kg applied weight and 190° C. measurement temperature is $\leq 0.8$ g/10 minutes, preferably $\leq 0.5$ g/10 minutes, and in particular $\leq 0.2$ g/10 minutes.

Polyoxymethylene copolymers of this type have a very high molecular weight. For example, linear POM copolymers having an $MFI_{190° C./2.16 kg}$ of <0.8 g/10 minutes exhibit a considerable improvement in the impact resistance compared to products of lower molecular weight. Even better are materials with an $MFI_{190° C./2.16 kg}$ of <0.50 g/10 minutes. Most suitable are materials in which the MFI is below 0.20 g/10 minutes.

The values of the reduced specific viscosity (RSV) of the polyoxymethylene are generally from 0.2 to 0.9 dl/g in commercially available products (measured in γ-butyrolactone, stabilized with 0.5% by weight of diphenylamine, at 140° C. in a concentration of 0.5 g/100 ml). The molding materials according to the invention on the other hand have RSV values greater than 1.7 dl/g.

In the measurement of the properties according to DIN 53453 and DIN 53443 at 23° C., in for example the case of the notched impact strength $a_k$ of more than 10 $mJ/mm^2$, the values of elastomer-modified products are reached or in some cases even exceeded. Similarly, the values of more than 6 mm for the deformation in the penetration test and the required fracture energy of more than 7 J, the total energy being more than 11 J, show that the level of the elastomer-modified products can be reached without any admixture of foreign substances.

In the elongation at break an improvement of 30% compared to the unmodified, commercially available polyoxymethylenes was also achieved.

It is therefore possible to prepare high impact strength POM molding materials without the addition of substantial amounts of foreign substances in the form of impact modifiers.

These materials can be prepared in the usual, continuously operating production machines with the known initiators and comonomers. Comonomers that may be used include cyclic ethers such as ethylene oxide and/or cyclic acetals such as dioxolane or butanediol formal. Particular preference is given to the use of comonomers leading to a $C_2$-unit in the polymer chain. The most suitable comonomer is dioxolane. The proportion of the comonomers in the reaction mixture is from 0.1 to 10 mol %, preferably from 1.0 to 8 mol %, and in particular from 2 to 6 mol %. Initiators that can be used in the process according to the invention are the already known and often described initiators such as Lewis acids or protonic acids. It is preferred to use heteropoly acids as polymerization initiators. The formula of the heteropoly acids that are used is $H_{8-n}[A(M_{12}O_{40})]_{n-8}$. In the formula M is a metal atom of Subgroup VI of the Periodic System. Molybdenum or tungsten is particularly suitable. The hetero atom A may for example be boron, silicon, phosphorus or arsenic, and its valency n may have the value 3, 4 or 5. Particularly advantageous are heteropoly acids containing phosphorus as hetero atom. Tungstophosphoric acid $H_3[P(W_{12}O_{40})]$ is most suitable. The amount of initiator used is in the range from 0.2 to 10 ppm, preferably from 1 to 7 ppm, based on the reaction mixture. The best results can be achieved with an amount of initiator of from 2 to 5 ppm of heteropoly acid.

The polymerization of formaldehyde and/or trioxane with up to 10 mol % of comonomers is carried out in inert media at temperatures of from 61° to 80° C., in order to obtain ultra-high molecular weight polyoxymethylene copolymers. The pressure in the polymerization reaction is from 1 to 3 bar.

The molding material according to the invention may, if desired, also contain known, conventional additives such as stabilizers, nucleating agents, antistatics, light stabilizers, flameproofing agents, lubricants and lubricating agents, plasticizers, pigments, dyes, optical brighteners, processing auxiliaries and the like, the amount of which may be up to 50% by weight, based on the total mixture.

These molding materials can be processed, like the commercially available polyacetals, by injection molding or extrusion. Moldings can be produced directly by injection molding. The materials are, however just as suitable for processing by extrusion. The final shaping is then effected by the machining of the extruded semi-finished products. Blow-molding processes such as extrusion blow molding or stretch blow molding can also be used for the processing of the described materials.

EXAMPLES

The parts given in the following examples are parts by weight, the MFI values were measured at 190° C. with an applied weight of 2.16 kg, unless otherwise stated.

1. 97 parts of trioxane are polymerized with 3 parts of dioxolane in the presence of 1 ppm of tungstophosphoric acid as initiator in a suspension liquor of low-viscosity paraffin oil at 63° C. 200 g of suspension agent are used per 20 g of crude polymer. The crude polymer obtained is freed from unreacted monomers and hemiacetal terminal groups by heating in a methanol-water mixture in the presence of basic substances, dried, mixed with the customary stabilizers and extruded. The material has a melt flow index of 0.71 g/10 minutes. The mechanical properties of this material are shown in Table 1 in comparison with commercially available products (C1 and C2).

TABLE 1

| | | Example 1 | C1 | C2 |
|---|---|---|---|---|
| $MFI_{190° C./2.16 kg}$ | g/10 min | 0.71 | 2.5 | 7.0 |
| Notched impact strength | mJ/mm² | 10.2 | 6.5 | 7.0 |

TABLE 1-continued

| | | Example 1 | C1 | C2 |
|---|---|---|---|---|
| Penetration test: | | | | |
| Total energy | J | 12.4 | 6.5 | 12.0 |
| Deformation | mm | 6.3 | 1.9 | 5.0 |

C1 = POM copolymer, unmodified
C2 = POM copolymer, MFI 9 g/10 min, impact-modified with 20% of aromatic polyurethane 2) 98 parts of trioxane are polymerized with 2 parts of ethylene oxide in the presence of 30 ppm of boron trifluoride as initiator in a continuously operating kneader at 75° C. The crude polymer obtained is freed from unreacted monomers and hemiacetal terminal groups as described in Example 1 and mixed with the customary stabilizers. The material has a melt flow index of 0.24 g/10 minutes. The mechanical properties of this material are shown in Table 2 in comparison with the values of C1 and C2.

TABLE 2

| | | Example 2 | C1 | C2 |
|---|---|---|---|---|
| $MFI_{190° C./2.16 kg}$ | g/10 min | 0.24 | 2.5 | 7.0 |
| Notched impact strength | mJ/mm² | 11.80 | 6.5 | 7.0 |

3) 98 parts of trioxane are polymerized with 2 parts of ethylene oxide in the presence of 20 ppm of boron trifluoride as initiator in a continuously operating extruder at 77° C. The crude polymer obtained is freed from unreacted monomers and hemiacetal terminal groups as described in Example 1 and mixed with the customary stabilizers. The material has a melt flow index of 0.19 g/10 minutes. The mechanical properties of this material are given in Table 3.

TABLE 3

| | | Example 3 |
|---|---|---|
| $MFI_{190° C./2.16 kg}$ | g/10 min | 0.19 |
| Notched impact strength | mJ/mm² | 19.5 |
| Penetration test: | | |
| Total energy | J | 11.6 |
| Deformation | mm | 6.7 |

We claim:
1. A high-impact strength polyoxymethylene molding composition without a thermoplastic elastomer consisting essentially of linear polyoxymethylene copolymers having a melt flow index MFI in the range of from about 0.1 g/10 min. to <0.8 g/10 min. for a weight of 2.16 kg and a measuring temperature of 190° C., and a notch impact strength $a_n$, measured in accordance with DIN 53453 at 23° C. of greater than 10 mJ/mm².

2. A molding composition as claimed in claim 1, wherein the polyoxymethylene copolymers have a reduced specific solution, viscosity of greater than 2.5 dl/g, measured in γ-butyrolactone, in a concentration of 0.5 g/100 ml at 140° C.

3. A molding composition as claimed in claim 1, which contains up to 5% by weight of other conventional additives.

4. A molding composition as claimed in claim 1, wherein the notch impact strength $a_n$, measured in accordance with DIN 53453 at 23° C., is greater than 10 mJ/mm²,
the fracture energy in the penetration test in accordance with DIN 53443, measured at 23° C., is greater than 7 J, the deformation in the penetration test in accordance with DIN 53443, measured at 23° C., is greater than 6 mm, and the total work in the penetration test in accordance with DIN 53443, measured at 23° C., is greater than 11 J.

5. A molding composition as claimed in claim 1, wherein the melt flow index MFI is in the range of from about 0.1 g/10 min to about 0.5 g/10 min.

6. A molding composition as claimed in claim 1, which contains at least one stabilizer, nucleating agent, antistatic, light stabilizer, flameproofing agent, lubricant, plasticizer, pigment, dye, optical brightener or processing assistant in an amount about 0.01 to 50% by weight.

7. A molding produced from a molding composition as claimed in claim 1.

8. A molding composition as claimed in claim 1, wherein the melt flow index MFI is in the range of form about 0.1 g/10 min. to about 0.2 g/10 min.

9. A high impact strength polyoxymethylene molding composition consisting essentially of linear polyoxymethylene copolymers having a melt flow index MFI in the range of from about 0.1 g/10 min. to <0.8 g/10 min. for a weight of 2.16 kg and a measuring temperature of 190° C., and a notch impact strength $a_n$, measured in accordance with DIN 53453 at 23% of greater than 10 mJ/mm$^2$, and at least one stabilizer, nucleating agent, antistatic, light stabilizer, flameproofing agent, lubricant, plasticizer, pigment, dye, optical brightener or processing assistant in an amount about 0.01 to 50% by weight.

10. A molding composition as claimed in claim 1, wherein the polyoxymethylene copolymers contain the comonomers dioxolane, butanediol formal or ethylene oxide.

\* \* \* \* \*

UNITED STATES PATENT AND TRADEMARK OFFICE
CERTIFICATE OF CORRECTION

PATENT NO. : 5,500,477
DATED : March 19, 1996
INVENTOR(S) : Gerhard Reuschel et al It is certified that error appears in the above-indentified patent and that said Letters Patent is hereby corrected as shown below:

Column 4, line 61 (claim 3, line 2), "5%" should read -- 50% --.

Signed and Sealed this

Twenty-fourth Day of December, 1996

Attest:

BRUCE LEHMAN

Attesting Officer

Commissioner of Patents and Trademarks